(No Model.)

H. G. M. HOWARD.
TWO WHEELED VEHICLE.

No. 361,288. Patented Apr. 19, 1887.

Witnesses.
John C. Perkins
Lea C. West

Inventor.
Henry G. M. Howard
By Lucius C. West
atty.

UNITED STATES PATENT OFFICE.

HENRY G. M. HOWARD, OF KALAMAZOO, MICHIGAN.

TWO-WHEELED VEHICLE.

SPECIFICATION forming part of Letters Patent No. 361,288, dated April 19, 1887.

Application filed November 1, 1886. Serial No. 217,735. (No model.)

*To all whom it may concern:*

Be it known that I, HENRY G. M. HOWARD, a citizen of the United States, residing at Kalamazoo, county of Kalamazoo, State of Michigan, have invented a new and useful Two-Wheeled Vehicle, of which the following is a specification.

This invention relates to that class of two-wheeled vehicles commonly styled "spiral spring-carts."

It has for its object the construction of a new spring, and its combination with the vehicle axle and body.

Figure 1:
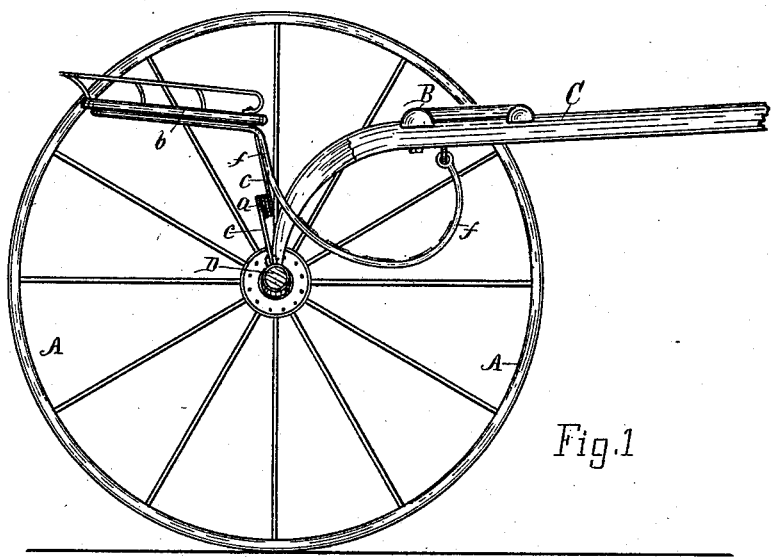
Figure 2:
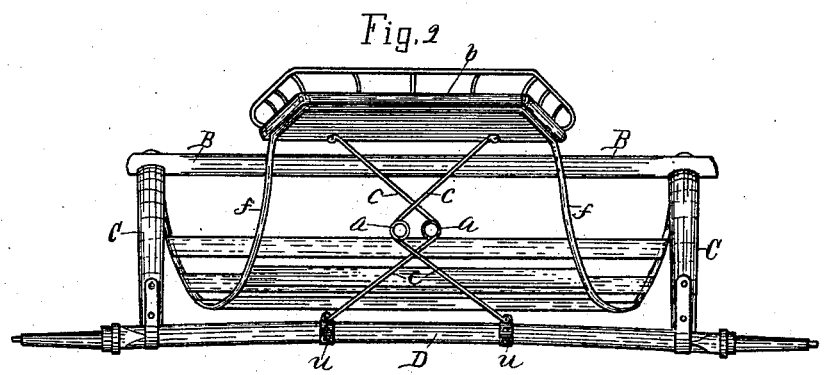
Figure 3:
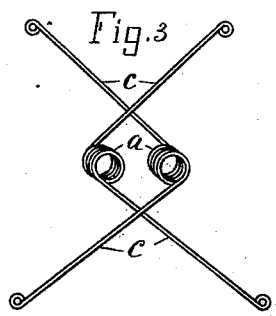

In the drawings forming a part of this specification, Figure 1 is a side elevation with one wheel removed and portions of the thill broken away; Fig. 2, a rear elevation; and Fig. 3, enlarged details in perspective, below described.

Referring to the lettered parts of the drawings, C are the thills, *f* the body or seat-bars, *b* the seat, D the axle, and A the wheel, all substantially as heretofore disclosed. The seat-bars *f* are pivotally attached to the thill or cross-bar, Fig. 1. At *a* are shown two spiral springs in a horizontal position at right angles to the axle D. The free ends of each spring extend, one upward and one downward, at oblique diverging angles to each other, as at *c*. The lower and upper extended bars *c* cross each other, as in Fig. 3, thus bracing and supporting each other, when under strain, against bulging forward or backward.

The free ends of the lower bars are attached to the axle D, and the free ends of the upper bars to the seat or rear end of the body. When the body is borne down, the springs *a* move farther apart, and the bars *c* have an equal coiling purchase on each end of the springs. In such a construction the seat-bars may be of light material. The forward end may be pivotally attached to the thills nearer the axle. There is but little horse motion, if any. The springs are cheap and safe and ornamental, and out of the way in entering the vehicle.

The free ends of the bars *c* are preferably pivotally attached to the axle and seat. In Fig. 2 they are pivoted to movable clips *u*, which clips may be moved farther apart or closer together to regulate the height of the body for light or heavy weight persons.

It will be observed that the action upon the springs is not to compress or expand them endwise; but the effect is a tendency to wind or coil and uncoil them at each end.

Of course the bars need not necessarily be crossed, and as many or few of the springs may be employed as desirable.

Having thus described my invention, what I claim as new is—

1. The combination of a vehicle-body pivotally fulcrumed at the forward end, the axle, and the spiral springs having the extended end bars attached to the axle and to the rear end of the body, substantially as set forth.

2. The combination of a vehicle-body pivotally fulcrumed at the forward end, the axle, and the spiral springs having the obliquely-extended bars crossing each other and being attached to the body and axles, substantially as set forth.

In testimony of the foregoing I have hereunto subscribed my name in presence of two witnesses.

HENRY G. M. HOWARD.

Witnesses:
JOSEPHA FRANKLIN,
C. M. WHEELER.